(12) United States Patent
Discekici et al.

(10) Patent No.: US 11,352,454 B2
(45) Date of Patent: Jun. 7, 2022

(54) REVERSE IODINE TRANSFER POLYMERIZATION METHOD AND COMPOSITIONS THEREFROM

(71) Applicants:Dow Global Technologies LLC, Midland, MI (US); Rohm and Haas Company, Collegeville, PA (US); The Regents of the University of California, Oakland, CA (US)

(72) Inventors: Emre Discekici, Goleta, CA (US); In-Hwan Lee, Goleta, CA (US); Alaina McGrath, Santa Barbara, CA (US); Craig Hawker, Santa Barbara, CA (US); Jing Ming Ren, Hockessin, DE (US); David Laitar, Midland, MI (US); Antony Van Dyk, Blue Bell, PA (US)

(73) Assignees: DOW GLOBAL TECHNOLOGIES LLC, Midland, MI (US); ROHM AND HAAS COMPANY, Collegeville, PA (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 17/426,486

(22) PCT Filed: Feb. 7, 2020

(86) PCT No.: PCT/US2020/017178
§ 371 (c)(1),
(2) Date: Jul. 28, 2021

(87) PCT Pub. No.: WO2020/167600
PCT Pub. Date: Aug. 20, 2020

(65) Prior Publication Data
US 2022/0112317 A1 Apr. 14, 2022

Related U.S. Application Data

(60) Provisional application No. 62/803,633, filed on Feb. 11, 2019.

(51) Int. Cl.
*C08F 20/06* (2006.01)

(52) U.S. Cl.
CPC .......... *C08F 20/06* (2013.01); *C08F 2438/00* (2013.01)

(58) Field of Classification Search
None
See application file for complete search history.

(56) References Cited

U.S. PATENT DOCUMENTS 2,289,540 A 7/1942 Dittmar et al.
2,789,099 A 4/1957 Rife et al.
(Continued)

FOREIGN PATENT DOCUMENTS

EP 0489370 A1 6/1992
WO 02070571 A1 9/2002
(Continued)

OTHER PUBLICATIONS

Tonnar, J. et al., "Use of Sodium Iodide as the Precursor to the Control Agent in Ab Initio Emulsion Polymerization". Angew. Chem. Int. Ed. 2008, 47(7), 1294-1297. (Year: 2008).*
(Continued)

*Primary Examiner* — Richard A Huhn
(74) *Attorney, Agent, or Firm* — Cantor Colburn LLP

(57) ABSTRACT

Reverse iodine transfer polymerization of an ethylenically unsaturated monomer comprising (meth)acrylic acid, salt thereof, or combination thereof, in the presence of a radical polymerization initiator, an oxidant, an iodide salt, and a solvent, is a useful method for making (meth)acrylic acid polymers. The amounts of components utilized can be 5 to (Continued)

500 equivalents of the ethylenically unsaturated monomer comprising (meth)acrylic acid, salt thereof, or combination thereof, in the presence of 1 to 3 equivalents of the radical polymerization initiator, 0.2 to 1 equivalent of the oxidant, and 1 equivalent of the iodide salt. (Meth)acrylic acid polymer solutions are made by these methods. The (meth) acrylic polymers are useful as dispersants.

17 Claims, 3 Drawing Sheets

(56) References Cited

U.S. PATENT DOCUMENTS

| | | | |
|---|---|---|---|
| 3,509,114 | A | 4/1970 | Ballast et al. |
| 3,945,843 | A | 3/1976 | Holty et al. |
| 3,983,187 | A | 9/1976 | Moczygemba et al. |
| 4,055,713 | A | 10/1977 | Moczygemba et al. |
| 4,158,678 | A | 6/1979 | Tatemoto et al. |
| 4,314,044 | A | 2/1982 | Hughes et al. |
| 4,622,425 | A | 11/1986 | Gagne et al. |
| 5,077,361 | A | 12/1991 | Hughes et al. |
| 5,223,590 | A | 6/1993 | Hughes et al. |
| 5,294,686 | A | 3/1994 | Fiarman et al. |
| 5,891,972 | A | 4/1999 | Egraz et al. |
| 6,143,848 | A | 11/2000 | Lee et al. |
| 6,335,404 | B1 | 1/2002 | Kirk et al. |
| 2002/0115798 | A1 | 8/2002 | Narayan-Sarathy et al. |
| 2005/0171312 | A1 | 8/2005 | Lacroix-Desmazes et al. |
| 2006/0111534 | A1 | 5/2006 | Suau et al. |
| 2007/0179262 | A1 | 8/2007 | Suau et al. |
| 2010/0105832 | A1 | 4/2010 | Csihony et al. |
| 2012/0157596 | A1 | 6/2012 | Da Silva et al. |
| 2012/0202937 | A1 | 8/2012 | Urtel et al. |
| 2012/0220707 | A1 | 8/2012 | Dungworth et al. |
| 2016/0347872 | A1* | 12/2016 | Goto .................. C08F 4/04 |

FOREIGN PATENT DOCUMENTS

| | | | | |
|---|---|---|---|---|
| WO | | 03097704 | A1 | 11/2003 |
| WO | | 03097705 | A1 | 11/2003 |
| WO | | 2004009644 | A2 | 1/2004 |
| WO | | 2004009648 | A2 | 1/2004 |
| WO | | 2004094356 | A1 | 11/2004 |
| WO | | 2006024706 | A1 | 3/2006 |
| WO | | 2012083196 | A2 | 6/2012 |
| WO | | 2018180547 | A1 | 10/2018 |
| WO | WO-2018180547 | A1 * | 10/2018 | .......... C07C 69/675 |

OTHER PUBLICATIONS

Boyer et al; "Reverse Iodine Transfer Polymerization (RITP) of Methacrylate"; Macromolecules; vol. 39; 2006; pp. 4044-4053.

Couvreur et al.; "First Nitroxide-Mediated Controlled Free-Radical Polymerization of Acrylic Acid"; Macromolecules; vol. 36; 2003; pp. 8260-8267.

Discekici et al.; "Aqueous Reverse Iodine Transfer Polymerization of Acrylic Acid"; Journal of Polymer Science; vol. 57; 2019; pp. 1877-1881.

Goto et al.; "Reversible Chain Transfer Catalyzed Polymerization (RTCP) with Carbon Catalysts"; Institute for Chemical Research; pp. 1-2.

Goto et al.; "Reversible Generation of a Carbon-Centered Radical from Alkyl Iodide Using Organic Salts and Their Application as Organic Catalysts in Living Radical Polymerization"; American Chemical Society; vol. 135; 2013; pp. 11131-11139.

International Preliminary Report on Patentability; International Application No. PCT/US2020/017175; International Filing Date: Feb. 7, 2020; dated May 4, 2021; 5 pages.

International Preliminary Report on Patentability; International Application No. PCT/US2020/017178; International Filing Date: Feb. 7, 2020; dated Jun. 1, 2021; 6 pages.

International Search Report; International Application No. PCT/US2020/017175; International Filing Date: Feb. 7, 2020; dated May 29, 2020; 6 pages.

International Search Report; International Application No. PCT/US2020/017178; International Filing Date: Jun. 4, 2020; dated Jun. 4, 2020; 32 pages.

Iovu et al.:"Controlled/Living Radical Polymerization of Vinyl Acetate by Degenerative Transfer with Alkyl Iodides" Macromolecules; vol. 36; 2003; pp. 9346-9354.

Lacroix-Desmazes et al.,"Reversible Iodine Transfer Polymerization of Methyl Acrylate and n-Butyl Acrylate" Macromolecules; vol. 38; 2005; pp. 6299-6309.

Lai et al.;"Functional Polymers from Novel Carboxyl-Terminated Trithiocarbonates as Highly Efficient RAFT Agents"; Macromolecules; American Chemical Society, vol. 35, No. 18; 2002; pp. 6754 6756.

Liu et al.; "Straightforward catalyst/solvent-free iodine-meditated living radical polymerization of functional monomers driven by visible light irradiation"; Chemical Communication; vol. 52; 2016; pp. 10850-10853.

Loiseau et al.; "Synthesis and Characterizatipon of Poly(acrylic acid) Produced by RAFT Polymerization Application as a Very Efficient Dispersant of CaCO3 Kaolin and TiO2"; Macromolecules; vol. 36; 2003; pp. 3066-3077.

Matyjaszewski et al.; "Controlled Radical Polymerizations: The Use of Alkyl Iodides in Degenerative Transfer"; Macromolecules; vol. 28; 1995; pp. 2093-2095.

Matyjaszewski; "Controlled Radical Polymerization; State of the Art in 2008"; American Chemical Society; Chapter 1, 2009, pp. 1-13.

Millard et al.; "RAFT Polymerization of N-Isopropylacrylamide and Acrylic Acid under y-Irradiation in Aqueous Media"; Macromolecular Rapid Communications; vol. 27; 2006; pp. 821-828.

Muthukrishnan et al. "Ambient Temperature RAFT Polymerization of Acrylic Acid with Ultraviolet Radiation in Aqueous Solution"; Macromolecules; vol. 40; pp. 2978-2980.

Narupai et al.; "Low-Temperature, Rapid Copolymerization of Acrylic Acid and Sodium Acrylate in Water"; Polymer Chemistry; vol. 57, Issue 13, 2019, pp. 1-9.

Peng et al.;"Organocobalt Mediated Radical Polymerization of Acrylic Acid in Water"; Macromolecules; vol. 40; 2007; pp. 6814-6819.

Romack et al.; "Precipitation Polymerization of Acrylic Acid in Supercritical Carbon Dioxide"; Macromolecules; vol. 28; 1995; pp. 912-915.

Sarkar et al.,"Living Radical Polymerization with Alkali and Alkaline Earth Metal Iodides as Catalysts" Macromolecules; ACS Publications; vol. 49; 2016; pp. 5033-5042.

Tonnar et al."Use of Sodium Iodide as the Precursor to the Control Agent in Ab Initio Emulsion Polymerization" Angew. Chem. Int. Ed.; vol. 47; 2008; pp. 1294-1297.

Tonnar et al."Use of Sodium Iodide as the Precursor to the Control Agent in Ab Initio Emulsion Polymerization" Angew. Chem. Int. Ed.; vol. 47; 2008; pp. 1314-1317.

Tonnar et al.;"Controlled Radical Ab Initio Emulsion Polymerization of n-Butyl Acrylate by Reverse Iodine Transfer Polymerization (RITP): Effect of the Hydrolytic Disproportionation of Iodine"; Macromolecules Rapid Comm; vol. 27; 2006; pp. 1733-1738.

Tonnar et al.;"Controlled Radical Polymerization of Styrene by Reverse Iodine Transfer Polymerization (RITP) in Miniemulsion: Use of Hydrogen Peroxide as Oxidant"; Macromolecules; vol. 40; 2007; pp. 186-190.

Tonnar et al.;"Living Radical ab Initio Emulsion Polymerization of n-Butyl Acrylate by Reverse Iodine Transfer Polymerization (RITP): Use of Persulfate as Both Initiator and Oxidant"; Macromolecules; vol. 40; 2007; pp. 6076-6081.

Wang et al.:"Solvent-Selective Reactions of Alkyl Iodide with Sodium Azide for Radical Generation and Azide Substitution and Their Application to One-Pot Synthesis of Chain-End-Functionalized Polymers"; Journal of the ACS vol. 139; 2017; pp. 10551-10560.

(56) References Cited

OTHER PUBLICATIONS

Wolpers et al.:"UV Light as External Switch and Boost of Molar-Mass Control in Iodine-Mediated Polymerization"; Macromolecules; vol. 47; 2014; pp. 954-963.
Wolpers; "Advances in chain-growth control and analysis of polymer"; Gottingen; 2014; pp. 4-276.
Written Opinion; International Application No. PCT/US2020/017175; International Filing Date: Feb. 7, 2020; dated May 29, 2020; 7 pages.
Written Opinion; International Application No. PCT/US2020/017178; International Filing Date: Jun. 4, 2020; dated Jun. 4, 2020; 6 pages.
Xiao et al.;'Organocatalyzed Living Radical Polymerization via in Situ Halogen Exchange of Alkyl Bromides to Alkyl Iodides; Macromolecules; vol. 50; pp. 1882-1891.

\* cited by examiner

REVERSE IODINE TRANSFER POLYMERIZATION METHOD AND COMPOSITIONS THEREFROM

CROSS REFERENCE TO RELATED APPLICATIONS

This application is a National Stage application of PCT/US2020/017178, filed Feb. 7, 2020, which claims the benefit of U.S. Provisional Application No. 62/803,633, filed Feb. 11, 2019, both of which are incorporated by reference in their entirety herein.

BACKGROUND

Low number average molar mass ($M_n$) (meth)acrylic acid polymers, such as poly(acrylic acid) (PAA), poly(methacrylic acid) (PMAA), and salts thereof, are commercially useful as dispersants. However, the controlled polymerization of acrylic acid (AA) and methacrylic acid (MAA) with targeted $M_n$ is difficult, especially for polymers with $M_n$ below 20 kilograms per mole (kg/mol). Although there are methods for preparing low $M_n$ PAA and PMAA with narrow molecular weight distribution, or molar mass dispersity (Đ), expensive chain transfer agents (CTA) and complex processes or equipment are often required, which results in a high cost for the PAA or PMAA produced by these methods.

Reverse iodine transfer polymerization (RITP) has found utility in the controlled polymerization of methyl acrylate and n-butyl acrylate. In RITP, an ethylenically unsaturated monomer is polymerized in the presence of molecular iodine ($I_2$) and a radical polymerization initiator. A simplified chemical mechanism of RITP is depicted in FIG. 1. In FIG. 1, 101 represents an inhibition period in which the CTA, $A\text{-}M_n\text{-}I$ ($n \geq 20$), is formed in situ, A. is a carbon-centered radical derived from the radical polymerization initiator and M is an ethylenically unsaturated monomer. 102 represents the polymerization period, wherein $A\text{-}M_n\cdot$, $A\text{-}M_m\cdot$ represent propagating polymer chains, $k_{ex}$ is the degenerative chain transfer rate constant, and $k_p$ is the propagation rate constant. In the degenerative chain transfer equilibrium, both a new propagating polymer chain, $A\text{-}M_n\cdot$, and a new CTA, $A\text{-}M_m\text{-}I$, are simultaneously produced.

A major problem with RITP is the use of $I_2$. $I_2$ is only slightly water-soluble, so RITP is conducted in organic solvents. If it is to be used with water as the solvent, it has to be dissolved in the monomer before use. Moreover, $I_2$ is reactive toward a large number of chemical compounds, and is subject to disproportionation into iodate and iodide in water. $I_2$ is also potentially dangerous upon storage and handling, in view of the risk of formation of $I_2$ vapor. It causes skin irritation, serious eye irritation, is harmful when inhaled, may cause drowsiness or dizziness, and causes damage to organs through prolonged or repeated exposure. Thus there are many health and safety issues associated with the use of $I_2$ in a manufacturing process.

Due to their commercial importance, it is desirable to have a polymerization method to produce PAA and PMAA of controlled $M_n$ and narrow molecular weight distribution (low Đ), with high monomer conversion. It is also desirable that the method does not use $I_2$ due to the problems described above, and that transition metal catalysts, and expensive and problematic CTAs, such as cobalt complexes, nitroxides, dithioesters, thiocarbamates, xanthates, and p-toluenesulfonyl iodide, not be used. It is also desirable that, unlike the above methods, the direct polymerization of (meth)acrylic acid does not require organic solvents, and can be conducted in water instead. Moreover, the polymerization method should provide linear polymers having low $M_n$ and Đ under mild conditions and provide high monomer conversion in short time.

BRIEF DESCRIPTION

A method of making a (meth)acrylic acid polymer comprises reverse iodine transfer polymerization of an ethylenically unsaturated monomer comprising (meth)acrylic acid, salt thereof, or combination thereof, in the presence of: a radical polymerization initiator; an oxidant; an iodide salt; and a solvent. The method of making the (meth)acrylic acid polymer can comprise reverse iodine transfer polymerization of 5 to 500 equivalents of the ethylenically unsaturated monomer comprising (meth)acrylic acid, salt thereof, or combination thereof, in the presence of 1 to 3 equivalents of the radical polymerization initiator, 0.2 to 1 equivalent of the oxidant, and 1 equivalent of the iodide salt. (Meth)acrylic acid polymer solutions are made by these methods.

BRIEF DESCRIPTION OF THE DRAWINGS

Referring now to the drawings.

DETAILED DESCRIPTION

Figure 1:
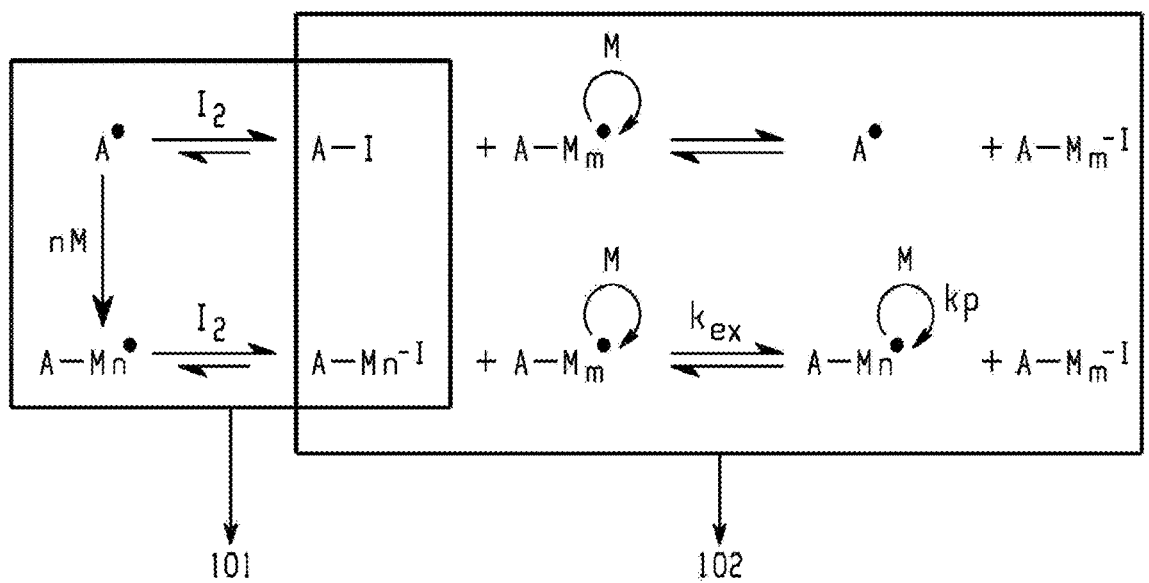
FIG. 1 is a schematic depiction of the mechanism of RITP, showing inhibition period (101) and polymerization period (102) reactions and equilibria.

The present inventors have developed a method for making a (meth)acrylic acid polymer, comprising reverse iodine transfer polymerization of an ethylenically unsaturated monomer comprising (meth)acrylic acid, salt thereof, or combination thereof, in the presence of a radical polymerization initiator; an oxidant; an iodide salt; and a solvent. This polymerization method produces (meth)acrylic acid polymers of controlled $M_n$ and narrow molecular weight distribution (low Đ), with high monomer conversion in short reaction times, and under mild conditions. Advantageously, this method does not utilize $I_2$, transition metal catalysts, or expensive and problematic CTAs, such as cobalt complexes, nitroxides, dithioesters, thiocarbamates, xanthates, or p-toluenesulfonyl iodide. Instead, the method utilizes water soluble iodide salts, such as NaI. A further benefit is that this method can be conducted in the absence of organic solvents using water as the solvent instead.

The ethylenically unsaturated monomer can be a combination of (meth)acrylic acid and salt thereof. For example, the ethylenically unsaturated monomer can be a combination of acrylic acid and sodium acrylate or a combination of methacrylic acid and sodium methacrylate. The (meth) acrylic acid salt and the iodide salt can each be, independently, an alkali metal salt, an alkaline earth metal salt, an ammonium salt, a quaternary ammonium salt, or a combination comprising at least one of the foregoing salts. In some embodiments, the cation is sodium, potassium, or ammonium, for example sodium.

In addition to acrylic acid, methacrylic acid, or salts thereof, the ethylenically unsaturated monomer can further comprise one or more other (meth)acrylic or vinyl monomers. The other ethylenically unsaturated monomer can be another ionic monomer.

For example, the other ethylenically unsaturated monomer can be another carboxylic acid-functional monomer, such as crotonic acid, itaconic acid, an itaconic acid monoester, fumaric acid, a fumaric acid monoester, maleic acid, a maleic acid monoester, or a combination comprising at least one of the foregoing carboxylic acid monomers. The other ethylenically unsaturated monomer can also be a carboxylic acid anhydride-functional monomer, in which the carboxylic acid anhydride functionality can be converted to carboxylic acid functionality, for example maleic anhydride or itaconic anhydride.

The other ethylenically unsaturated monomer can also be an ionic monomer comprising a sulfonic acid-functional monomer, a phosphoric acid-functional monomer, a phosphonic acid-functional monomer, or a salt thereof. Examples of sulfonic acid-functional monomers include 2-sulfoethyl (meth)acrylate, 3-sulfopropyl (meth)acrylate, styrene sulfonic acid, vinyl sulfonic acid, and 2-(meth)acrylamide-2-methyl propanesulfonic acid. Examples of phosphoric acid-functional monomers include 2-phosphoethyl (meth) acrylate, 2-phosphopropyl (meth)acrylate, 3-phosphopropyl (meth)acrylate, phosphobutyl (meth)acrylate, and 3-phospho-2-hydroxypropyl (meth)acrylate. The phosphoric acid-functional monomer can also be a phosphoric acid ester of an alkoxylated hydroxyalkyl (meth)acrylate, for example a hydroxyethyl or hydroxypropyl (meth)acrylate ethoxylate or propoxylate having 1 to 50 ethoxy or propoxy repeat units. The ionic monomer can also be a cationic monomer, for example 2-(N,N-dimethylamino)ethyl (meth)acrylate.

The other ethylenically unsaturated monomer can also be a nonionic monomer. The nonionic monomer can be a hydrophilic nonionic ethylenically unsaturated monomer, for example hydroxyethyl (meth)acrylate, hydroxypropyl (meth)acrylate, polyethylene glycol (meth)acrylate, or (meth)acrylamide. The hydrophilic nonionic monomer can also be an alkoxylated hydroxyalkyl (meth)acrylate, for example a hydroxyethyl or hydroxypropyl (meth)acrylate ethoxylate or propoxylate having 1 to 50 ethoxy or propoxy repeat units. The nonionic monomer can also be a hydrophobic non-ionic monomer, for example an alkyl ester of (meth)acrylic acid, such as methyl (meth)acrylate, ethyl (meth)acrylate, butyl (meth)acrylate, 2-ethylhexyl (meth) acrylate, decyl (meth)acrylate, isodecyl (meth)acrylate, or lauryl (meth)acrylate. The nonionic monomer can also be styrene, or a substituted styrene such as α-methyl styrene, ethylene, an α-olefin such as propylene, 1-butene, 1-hexene, 1-octene, 1-decene, isobutylene, diisobutylene, or butadiene. The nonionic monomer can also be a vinyl monomer, such as acrylonitrile, vinyl chloride, vinyl acetate, vinyl butyrate, or a vinyl ester of a branched, tertiary-alkyl alcohol, sold under the tradename VeoVa™, for example VeoVa™ 9 Monomer, VeoVa™ 10 Monomer, or VeoVa™ 11 Monomer, available from Momentive Specialty Chemicals.

The amount of ethylenically unsaturated monomer comprising (meth)acrylic acid or salt thereof can be 5 to 500 equivalents, based on the moles of iodide salt. Within this range, the amount of ethylenically unsaturated can be greater than or equal to 10, 25, or 50 equivalents and less than or equal to 75, 100, 150, or 300 equivalents. In some embodiments, the amount of ethylenically unsaturated monomer is 25 to 150 equivalents, 25 to 75 equivalents, or 50 to 100 equivalents, based on the moles of iodide salt. When the ethylenically unsaturated monomer comprises a combination of (meth)acrylic acid and (meth)acrylate salt, the amount of each can be, independently, 2.5 to 250 equivalents, based on the moles of iodide salt. Within this range, the amount of (meth)acrylic acid and (meth)acrylic acid salt can be each, independently, greater than or equal to 5, 12.5, or 25 equivalents and less than or equal to 37.5, 50, 75, or 150 equivalents. In some embodiments, the amount of (meth)acrylic acid and (meth)acrylic acid each, is independently 2 to 100 equivalents, or 4 to 45 equivalents, based on the moles of iodide salt.

The reverse iodine transfer polymerization is conducted in the presence of a radical polymerization initiator. Any thermally unstable compound that generates carbon-centered radicals can serve as the radical polymerization initiator. In some embodiments, the radical polymerization initiator is an azo polymerization initiator. Azo polymerization initiators are organic compounds containing a —N=N— functional group substituted with tertiary alkyl groups, and are characterized by their 10-hour half-life temperature, i.e. the temperature at which half of the azo compound decomposes in 10 h. Azo compounds are commercially available from Wako Chemicals USA, Richmond, Va. The azo polymerization initiator can be oil-soluble or water-soluble. The azo polymerization initiator can be, for example, an azo nitrile, such as 2,2'-azobis(2-methylpropionitrile) (AIBN, 10 hour half-life temperature of 65° C., oil-soluble) or 2,2'-azobis (4-methoxy-2,4-dimethylvaleronitrile) (V70, 10-hour half-life temperature of 30° C., oil-soluble), or 4,4'-azobis(4-cyanopentanoic acid) (V501, 10-hour half-life temperature of 69° C., water-soluble). The azo polymerization initiator can also be an azo amide, such as VA086, or an azo imidazoline, such as V061 or V044. The amount of radical polymerization initiator used in the method can be 1 to 3 equivalents, based on the moles of iodide salt. Within this range, the amount of radical polymerization initiator can be greater than or equal to 1.05, 1.1, or 1.2 equivalents and less than or equal to 1.4, 2.0, or 2.5 equivalents. In some embodiments, the amount of radical polymerization initiator is 1.2 to 1.4 equivalents.

The reverse iodine transfer polymerization is conducted in the presence of an oxidant. In some embodiments, the oxidant is a peroxide. The peroxide is herein defined as any compound with an —O—O— group, and can be inorganic or organic. The peroxide can be, for example, hydrogen peroxide, an alkali metal peroxide, such as sodium or potassium peroxide, a tert-alkyl hydroperoxide, such as cumene hydroperoxide or tert-butyl hydroperoxide, a tert-alkyl peroxide, such as dicumyl peroxide or di-tert-butyl hydroperoxide, a tert-alkyl perester wherein the tert-alkyl group has at least 5 carbon atoms, such as tert-amyl peroxybenzoate, ammonium and/or alkali metal persulfates, such as ammonium persulfate, sodium persulfate, and potassium persulfate, sodium perborate, peroxyphosphoric acid and salts thereof, peroxymonosulfuric acid and salts thereof. The oxidant can also be an oxidant other than a peroxide, for example potassium permanganate. In some embodiments, the oxidant comprises hydrogen peroxide, sodium persulfate, potassium persulfate, or a combination comprising at least one of the foregoing oxidants. The amount of oxidant used in the method can be 0.2 to 2 equivalents, based on the moles of iodide salt. Within this range, the amount of oxidant can be greater than or equal to 0.3, 0.4, 0.5, or 0.6 equivalent and less than or equal to 0.8, 0.9, 1.0, or 1.5 equivalent. In some embodiments, the amount of oxidant is 0.4 to 1 equivalent, 0.6 to 1 equivalent, or 0.6 to 0.8 equivalent.

The reverse iodine transfer polymerization is conducted in the presence of an iodide salt, which serves as a molar mass control agent. Any inorganic or organic cation can be used as the counterion, so long as the iodide salt has the required reactivity in controlling $M_n$ and Đ. The iodide salt can be, for example, an alkali metal salt, an alkaline earth metal salt, an ammonium salt, a quaternary ammonium salt, or a combination comprising at least one of the foregoing salts. In some embodiments, the iodide salt is lithium iodide, sodium iodide, potassium iodide, ammonium iodide, or a combination comprising as least one of the foregoing iodide salts. In some embodiments, the iodide salt is sodium iodide. The relative amounts of ethylenic unsaturated monomer, radical polymerization initiator, and oxidant disclosed herein as equivalents based on the amount of iodide salt. Conversely, the amount of iodide salt can also be based on the amount of ethylenically unsaturated monomer. Thus, the amount of iodide salt can be, for example 0.002 to 0.2 equivalents, based on the amount of ethylenically unsaturated monomer. Within this range, the amount of iodide salt can be 0.00667 to 0.04 equivalents, 0.0133 to 0.04 equivalents, or 0.01 to 0.02 equivalents.

Advantageously, the reverse iodine transfer polymerization can be conducted over a broad range of temperatures and times. In some embodiments, the polymerization is conducted at 20 to 140° C. for 1 minute to 48 hours. Within this temperature range, the temperature can be, for example, greater than or equal to 25, 30, or 35° C. and less than or equal to 70, 80, 90, 100, or 110° C. The temperature will depend in part on the 10-hour half-life decomposition temperature, i.e. the temperature at which the half-life of the radical polymerization initiator is 10 hours. The 10-hour half-life decomposition temperatures of V70 and V501 are 30° C. and 69° C., respectively. Thus, when the radical polymerization initiator is V70, the polymerization can be 35 to 70° C., and when the radical polymerization initiator is V501, the polymerization temperature can be 70 to 110° C. The time will in part depend on the polymerization temperature. The time can be, for example, greater than or equal to 3, 5, 10, or 15 minutes and less than or equal to 0.75, 1, 6, 12, or 18 hours. Under some conditions, the reverse iodine transfer polymerization can be conducted at relatively mild temperatures and short times, while still obtaining high conversions. For example, the reverse iodine transfer polymerization can be conducted at 90 to 110° C. for 15 to 45 minutes.

Advantageously, the reverse iodine transfer polymerization method can be conducted in an aqueous solvent. The use of water avoids the flammability and toxicity issues associated with many organic solvents, thereby providing a "green" polymerization method. The solvent can be a combination of water and a water-miscible organic solvent. Thus in some embodiments, the solvent is an aqueous solvent comprising 50 to 100 volume percent water, based on the total volume of the solvent. Within this range the aqueous solvent can be greater than or equal to 80, 90, 95, or 99 volume percent water and less than or equal to 100 volume percent water. In some embodiments, the aqueous solvent is 100 volume percent water. In some embodiments, the ethylenically unsaturated monomer is present as a 10 to 90 volume percent solution in water, based on the total volume of the ethylenically unsaturated monomer and water. Within this range, the amount of ethylenically unsaturated monomer in water can be greater or equal to 20, 30, or 40 volume percent and less than or equal to 50, 60, 70, or 80 volume percent. In some embodiments, the amount of ethylenically unsaturated monomer in water is 30 to 60 volume percent, or 40 to 60 volume percent.

Advantageously, the inventors have determined molar ratios of ethylenically unsaturated monomer comprising (meth)acrylic acid or salt thereof, radical polymerization initiator, oxidant, and iodide salt, that provide predominantly linear (meth)acrylic acid polymer of low $M_n$ and Đ and with high monomer conversion. Thus in some embodiments, the method comprises reverse iodine transfer polymerization of 5 to 500 equivalents of the ethylenically unsaturated monomer comprising (meth)acrylic acid, salt thereof, or combination thereof, in the presence of 1 to 3 equivalents of the radical polymerization initiator, 0.2 to 1 equivalent of the oxidant, and 1 equivalent of the iodide salt. In some embodiments, the method comprises reverse iodine transfer polymerization of 2.5 to 250 equivalents of (meth)acrylic acid and 2.5 to 250 equivalents of a salt of (meth)acrylic acid, in the presence of 1 to 3 equivalents of the radical polymerization initiator, 0.2 to 1 equivalent of the oxidant, and 1 equivalent of the iodide salt.

Advantageously, the (meth)acrylic acid polymer made by the method is predominantly linear, and has a number average molar mass ($M_n$) of 1 to 100 kg/mol and a molar mass dispersity (Đ) of 1 to 5, as measured by chloroform size exclusion chromatography against polystyrene (PS) standards after methylation with trimethylsilyl diazomethane. The $M_n$ of the (meth)acrylic acid polymer is in the range 1 to 100 kg/mol. Within this range, the $M_n$ can be greater than or equal to 2, 3, 4, or 5 kg/mol and less than or equal to 15, 25, 30, 40, 50, and 75 kg/mol. In some embodiments, $M_n$ is in the range of 1 to 50 kg/mol, or 1 to 25 kg/mol. Đ of the (meth)acrylic acid polymer is in the range of 1 to 5. Within this range, Đ can be greater than or equal to 1 and less than or equal to 2, 2.5, 3, 4, or 5. In some embodiments, Đ is 1 to 2.5, or 1 to 2. The (meth)acrylic acid polymer made by the method is predominantly linear. As defined herein, "predominantly linear" means that the polymer has less than or equal to 5% branching, as calculated from $^{13}C$ NMR data as described in the Examples section under "Materials and Methods". Within this range, the (meth)acrylic acid polymer can have less than or equal to 4, 3, 2, or 1% branching.

Advantageously, the method is suited for the preparation of poly(acrylic acid-co-sodium acrylate) (P(AA-co-NaA)). Thus in some embodiments, the method comprises reverse iodine transfer polymerization of 2.5 to 250 equivalents of acrylic acid and 2.5 to 250 equivalents of sodium acrylate, both dissolved in water, to form a 40 to 60 volume percent solution, based on the total weight of the acrylic acid, sodium acrylate, and water, in the presence of 1 to 2 equivalents of an azo polymerization initiator; 0.4 to 1 equivalent of a persulfate, and 1 equivalent of an iodide salt.

The (meth)acrylic acid polymers made by the above method can be purified and isolated in solid form by dialysis and lyophilization as described in the Examples section under "Purification and Methylation of PAA". However, as (meth)acrylic acid polymers are often used in aqueous compositions, such as water-based coatings, purification and isolation may not be necessary for commercial use. Thus, in some embodiments, a (meth)acrylic acid polymer solution is made by a method comprising reverse iodine transfer polymerization of an ethylenically unsaturated monomer comprising (meth)acrylic acid, salt thereof, or combination thereof, in the presence of a radical polymerization initiator; an oxidant, an iodide salt; and a solvent. All of the variations for the method described herein are likewise applicable to the (meth)acrylic acid polymer solution made by the method. Thus, in some embodiments, the (meth)acrylic polymer or copolymer solution comprises 10 to 90 volume percent aqueous solution of the (meth)acrylic polymer of copolymer, based on the total volume of the (meth)acrylic polymer or copolymer and water. In some embodiments, the (meth)acrylic acid polymer solution is made by reverse iodine transfer polymerization of 5 to 500 equivalents of an ethylenically unsaturated monomer comprising (meth) acrylic acid, or salt thereof, in the presence of 1 to 3 equivalent of an azo polymerization initiator, 0.2 to 1 equivalent of an oxidant, and 1 equivalent of an iodide salt, and a solvent. In some embodiments, the (meth)acrylic acid polymer solution is made by copolymerization of 0.5 to 250 equivalents of acrylic acid and 0.5 to 250 equivalents of sodium acrylate. In some embodiments of the (meth)acrylic acid polymer solution, the (meth)acrylic acid polymer is predominantly linear, and has a number average molar mass ($M_n$) of 1 to 100 kg/mol and a molar mass dispersity (Đ) of 1 to 5, as measured by chloroform size exclusion chromatography against polystyrene (PS) standards after methylation with trimethylsilyl diazomethane.

When the (meth)acrylic acid polymer solution is not purified, for example by dialysis, by-products of the polymerization can be present. Depending upon the specific reagents used, the (meth)acrylic acid polymer solution can contain inorganic species, for example, iodide ion, triodide ion, an alkali metal ion, an alkaline earth metal ion, or an ammonium ion. Organic compounds derived from the radical polymerization initiator can also be present, for example 4-methoxy-2,4-dimethylpentanenitrile and 2-iodo-4-methoxy-2,4-dimethylpentanenitrile from decomposition of V70, 2-methylprioionitrile and 2-iodo-2-methylpropionitrile from decomposition of AIBN, and 4-cyanopentanoic acid and 4-iodo-4-cyanopantanoic acid from decomposition of V501.

This disclosure is further illustrated by the following aspects, which are not intended to limit the claims.

Aspect 1. A method of making a (meth)acrylic acid polymer, comprising reverse iodine transfer polymerization of an ethylenically unsaturated monomer comprising (meth) acrylic acid, salt thereof, or combination thereof, in the presence of: a radical polymerization initiator; an oxidant; an iodide salt; and a solvent.

Aspect 2. The method of aspect 1, wherein the ethylenically unsaturated monomer comprises a combination of (meth)acrylic acid and salt thereof.

Aspect 3. The method of aspect 1 or 2, wherein the (meth)acrylic salt and the iodide salt are each, independently, an alkali metal salt, an alkaline earth metal salt, an ammonium salt, a quaternary ammonium salt, or a combination comprising at least one of the foregoing salts.

Aspect 4. The method of any of aspects 1 to 3, wherein the ethylenically unsaturated monomer further comprises one or more other (meth)acrylic or vinyl monomers.

Aspect 5. The method of any of aspects 1 to 4, wherein the solvent is an aqueous solvent comprising 50 to 100 volume percent water, based on the total volume of the solvent.

Aspect 6. The method of any of aspects 1 to 5, wherein the radical polymerization initiator is an azo polymerization initiator.

Aspect 7. The method of any of aspects 1 to 6, wherein the oxidant is a peroxide.

Aspect 8. The method of any of aspects 1 to 7, wherein the polymerization is conducted at 0 to 140° C. for 1 minute to 48 hours.

Aspect 9. The method of any of aspects 1 to 8, wherein the solvent comprises water, and the ethylenically unsaturated monomer is present as a 10 to 90 volume percent solution in the solvent, based on the total volume of the ethylenically unsaturated monomer and solvent.

Aspect 10. The method of any of aspects 1 to 9, comprising reverse iodine transfer polymerization of 5 to 500 equivalents of the ethylenically unsaturated monomer comprising (meth)acrylic acid, salt thereof, or combination thereof, in the presence of 1 to 3 equivalents of the radical polymerization initiator, 0.2 to 1 equivalent of the oxidant, and 1 equivalent of the iodide salt.

Aspect 11. The method of any of aspects 1 to 10, comprising reverse iodine transfer polymerization of 2.5 to 250 equivalents of (meth)acrylic acid and 2.5 to 250 equivalents of a salt of (meth)acrylic acid, in the presence of 1 to 3 equivalents of the radical polymerization initiator, 0.2 to 1 equivalent of the oxidant, and 1 equivalent of the iodide salt.

Aspect 12. The method of any of aspects 1 to 11, wherein the (meth)acrylic polymer or copolymer is predominantly linear, and has a molar mass ($M_n$) of 1 to 100 kg/mol and a dispersity of 1 to 5, as measured by chloroform size exclusion chromatography against polystyrene standards after methylation with trimethylsilyl diazomethane.

Aspect 13. A method of making a (meth)acrylic polymer or copolymer, comprising reverse iodine transfer polymerization of 2.5 to 250 equivalents of acrylic acid and 2.5 to 250 equivalents of sodium acrylate, both dissolved in water to form a 40 to 60 volume percent solution, based on the total volume of the acrylic acid, sodium acrylate, and water, in the presence of: 1 to 2 equivalents of an azo polymerization initiator; 0.4 to 1 equivalent of a persulfate; and 1 equivalent of an alkali metal iodide.

Aspect 14. A (meth)acrylic polymer or copolymer solution made by the method of aspect 13.

Aspect 15. The (meth)acrylic polymer or copolymer solution of aspect 14, comprising a 10 to 90 volume percent aqueous solution of the (meth)acrylic polymer of copolymer, based on the total volume of the (meth)acrylic polymer or copolymer and water.

Aspect 16. The (meth)acrylic polymer or copolymer solution of aspect 14 or 15, made by reverse iodine transfer polymerization of 5 to 500 equivalents of the ethylenically unsaturated monomer comprising (meth)acrylic acid, salt thereof, or combination thereof, in the presence of 1 to 3 equivalents of the azo polymerization initiator, 0.2 to 1 equivalent of the oxidant, and 1 equivalent of the iodide salt.

Aspect 17. The (meth)acrylic polymer or copolymer solution of any of aspects 14 to 16, wherein the (meth)acrylic polymer or copolymer solution is made by copolymerization of 0.5 to 250 equivalents of acrylic acid and 2 to 250 equivalents of sodium acrylate.

Aspect 18. The (meth)acrylic polymer or copolymer solution of any of aspects 14 to 17, wherein the acrylic polymer or copolymer is predominantly linear, and has a number average molar mass ($M_n$) of 1 to 100 kg/mol and a dispersity of 1 to 5, as measured by chloroform size exclusion chromatography against polystyrene standards after methylation with trimethylsilyl diazomethane.

This disclosure is further illustrated by the following examples, which are not intended to limit the claims.

EXAMPLES

Materials and Methods

The materials and abbreviations used or mentioned herein are described in Table 1, and abbreviations used herein are defined in Table 2.

TABLE 1

Materials

| Short Name | Chemical Name | Source |
|---|---|---|
| AA | Acrylic acid, 99%, stabilized | Acros Organics |
| NaA | Sodium acrylate, 97% | Sigma Aldrich |
| PAA | Polyacrylic acid | Synthesized |
| P(AA-co-NaA) | Poly(acrylic acid-co-sodium acrylate) random copolymer | Synthesized |
| PMA | Poly(methyl acrylate) | Synthesized |
| PMMA | Poly(methyl methacrylate) | Agilent Technologies |
| Ar | Argon | Praxair |
| HCl | Hydrochloric acid | EMD Millipore |
| HI | Hydroiodic acid | Sigma Aldrich |
| $CHCl_3$ | Chloroform | Fisher Scientific |
| $I_2$ | Molecular iodine | Generated in situ. |
| NaI | Sodium iodide, 99% | Fisher Scientific or EMD Millipore |
| $TMS-CHN_2$ | Trimethylsilyl diazomethane, 2 M solution in diethyl ether | Sigma Aldrich |
| $D_2O$ | Deuterium oxide (heavy water) | Cambridge Isotope Laboratories, Inc. |
| V70 | 2,2'-Azobis(4-methoxy-2,4-dimethylpentanenitrile), 97% | Wako Chemicals USA |
| V501 | 4,4'-Azobis(4-cyanopentanoic acid) (ACVA) | Wako Chemicals USA |
| $(NH_4)_2S_2O_8$ | Ammonium persulfate | Sigma Aldrich |
| $K_2S_2O_8$ | Potassium persulfate | Sigma Aldrich |
| $Na_2S_2O_8$ | Sodium persulfate, ≥99% | Sigma Aldrich |
| $H_2O_2$ | Hydrogen Peroxide, 30% w/w in water | EMD Millipore |

TABLE 2

Abbreviations

| Abbreviation | Full Name |
|---|---|
| CTA | Chain transfer agent |
| RITP | Reverse iodine transfer polymerization |
| Đ | Molar mass dispersity |
| $DP_n$ | Degree of polymerization, n is the number of monomer repeat units. |
| dRI | Differential refractive index (refractive index relative to solvent). |
| $M_n$ | Number average molar mass |
| MWCO | Molecular weight cut-off |
| NMR | Nuclear magnetic resonance |
| SEC | Size exclusion chromatography |

Number average molar mass ($M_n$) and molar mass dispersity (Đ) were measured by size exclusion chromatography (SEC) with water as the eluent against PAA standards (aqueous SEC) using a refractive index detector. $M_n$ is reported in units of grams per mole (g/mol) or kilograms per mole (kg/mol). Đ is dimensionless.

$M_n$ and Đ were also measured by SEC on methylated polymers using a Waters 2690 separation module equipped with a Waters 2410 refractive index detector, with 0.25% trimethylamine in $CHCl_3$ as eluent, against PS standards. $M_n$ and Đ were also measured by $CHCl_3$ SEC of methylated polymers using a Waters Acquity Advanced Polymer Characterization (APC) separation module equipped with an Acquity UPLC refractive index detector against PS standards. PAA was methylated with $TMS-CHN_2$ according to the procedure below prior to $CHCl_3$ SEC measurement. PAA standards were prepared by deprotection of poly(t-butyl acrylate) made by atom transfer radical polymerization (ATRP).

Branching was measured by $^{13}$C-NMR by the method described in Gaborieau, M., *Macromolecules*, 2017, 50, 9032. The percentage of AA repeat units that are branched (DB) is calculated using Eq. 1.

$$DB(\%) = \frac{I(C_q) \times 100}{I(C_q) + \frac{I(CH + CH_2)}{2}} \quad (1)$$

Where $C_q$ is the quaternary (branching) carbon atoms, $I(C_q)$ is the integral of the $C_q$ signal, and $I(CH+CH_2)$ is the integral of the signals of the backbone tertiary and secondary (CH+$CH_2$) carbon atoms present in all the repeat units. DB can also be calculated using Eq. 2.

$$DB(\%) = \frac{I(C_q) \times 100}{I(C=O)} \quad (2)$$

Where I(C=O) is the integral of the signals of all carbonyl groups present in the main polymer chain, excluding end groups. The two methods provide similar results.

Purification and Methylation of PAA

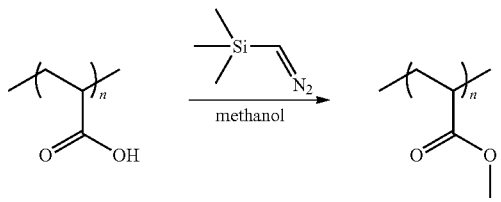

Crude PAA and P(AA-co-NaA) were diluted with deionized water, filtered through a 0.45-μm cellulose acetate membrane, and dialyzed against 1 M aq. HCl for 24 h, and then against deionized water, using cellulose ester dialysis tubing (SPECTRA/POR™ dialysis membrane having a MWCO of 1,000 g/mol, obtained from Repligen Corp.) for 48 h. After lyophilization (freeze-drying), the PAA was isolated as a slightly yellow or white powder.

The isolated polymer (PAA in both cases) was methylated using trimethylsilyl diazomethane, which solubilized it in organic solvents, according to a procedure published in Z. A. Page et al., *J. Polym. Sci. Part A: Polym. Chem.* 2016, 55, 801-807. To a 4-mL vial equipped with a magnetic stir bar were added 20.0 mg of purified PAA and 1.0 mL methanol. $TMS-CHN_2$ solution (1.0 mL of 2.0 M solution in diethyl ether) was added dropwise over 10 min at 0° C. Then, the solution was left stirring overnight at room temperature. Acetic acid was added to quench the unreacted $TMS-CHN_2$ before removing all the solvent and most volatile organic residuals under reduced pressure. The methylated polymer (PMA) was then dissolved in chloroform for SEC analysis to determine $M_n$ and Đ.

Examples 1-6. Polymerization of AA Using NaI and $(NH_4)_2S_2O_8$

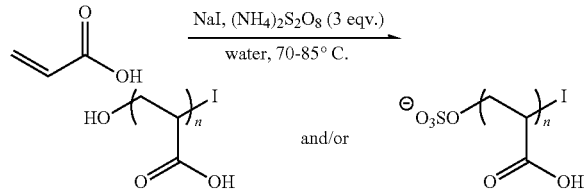

In a 1-dram vial, NaI (11.7 mg, 1 equiv) and $(NH_4)_2S_2O_8$ (53 mg, 3 equiv) were added and dissolved in either 0.4 mL of water or pH 1 HI solution. AA (0.4 mL, 75 equiv) (with inhibitor) was added along with a magnetic stir bar. The vial was capped with a septum sealed cap and degassed by sparging with Ar for 5 min. The vial was placed in an oil bath set at the desired temperature for each condition. A purple gas was observed a few minutes after putting the vial in the oil bath. The vial was allowed to react overnight for a total of 18 h. A small aliquot was taken and dissolved in $D_2O$ for $^1H$ NMR analysis. The results summarized in Table 3 below indicate that polymerization occurs, but at low conversion.

TABLE 3

Polymerization of AA Using NaI and $(NH_4)_2S_2O_8$

| Ex. | Solvent | Temperature (° C.) | Conversion (%) | Polymerization Time (h) |
| --- | --- | --- | --- | --- |
| 1 | $H_2O$ | 70 | 14 | 18 |
| 2 | pH = 1 aq HI | 70 | 6 | 18 |
| 3 | pH = 1 aq HI | rt | 0 | 18 |
| 4 | $H_2O$ | 85 | 10 | 18 |
| 5 | pH = 1 aq HI | 85 | 3 | 18 |
| 6 | $H_2O$, no NaI | 85 | Insoluble gel | <30 sec |

The polymerization mixture form Ex. 2 was dialyzed against water using dialysis tubing having a MWCO of 1,000. Water was removed via lyophilization, resulting in PAA as a white solid. The PAA was methylated using diazomethane and analyzed via chloroform SEC. The PAA has theoretical $M_n$ of 1200 g/mol, a measured $M_n$ of 2700 g/mol, and a Đ of 1.20.

Examples 7-8. Polymerization of 33% v/v AA Using NaI and $K_2S_2O_8$

In a 1-dram vial, NaI (11.7 mg, 1 equiv) and $K_2S_2O_8$ (63 mg, 3 equiv) were added and dissolved in 0.8 mL of water. At this time AA (0.4 mL, 75 equiv), passed through neutral alumina was added along with a magnetic stir bar. The vial was capped with a septum sealed cap and degassed by sparging with Ar for 5 min. The vial was placed in an oil bath set at the desired temperature (60 or 80° C.) for each condition. The vial was stirred overnight for a total of 18 h. A small aliquot was taken and dissolved in $D_2O$ for $^1H$ NMR analysis. AA conversion was 8 and 10% at 60 and 80° C., respectively.

Example 9. Polymerization of AA Using NaI and $H_2O_2$

In a 1-dram vial, NaI (11.7 mg, 1 equiv) and hydrogen peroxide (7 µL, 3 equiv) (approximately 24 µL of a 30% w/w solution in water) were added and dissolved in 0.4 mL of water. AA (0.4 mL, 75 equiv), passed through neutral alumina, was added along with a magnetic stir bar. The vial was capped with a septum sealed cap and degassed by sparging with Ar for 5 min. The vial was placed in an oil bath set at the desired temperature (45° C.). The vial was stirred overnight for a total of 18 hours. A small aliquot was taken and dissolved in $D_2O$ for $^1H$ NMR analysis. No polymerization was observed.

Examples 10-15. Polymerization of AA Using NaI, V70, and $K_2S_2O_8$ or $H_2O_2$

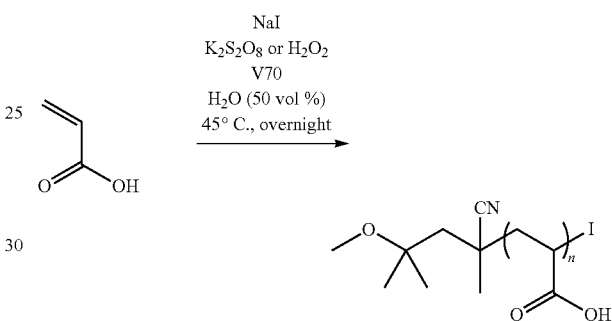

For Ex. 10 and 11, NaI (11.7 mg, 1 equiv), and either $K_2S_2O_8$ (63 mg, 3 equiv) or $H_2O_2$ (7 µL, 3 equiv) (approximately 24 µL of a 30% w/w solution in water) were added to a 1-dram vial, and dissolved in 0.4 mL of water. AA (0.4 mL, 75 equiv), passed through neutral alumina, and V70 (6 mg, 0.25 equiv) were added along with a magnetic stir bar. The vial was capped with a septum sealed cap and degassed by sparging with Ar for 5 min. The vial was placed in an oil bath set at 45° C. The vial was stirred overnight for a total of 18 h. A small aliquot was taken and dissolved in $D_2O$ for $^1H$ N/R analysis. No polymerization was observed in either Ex. 10 or 11.

Figure 2:
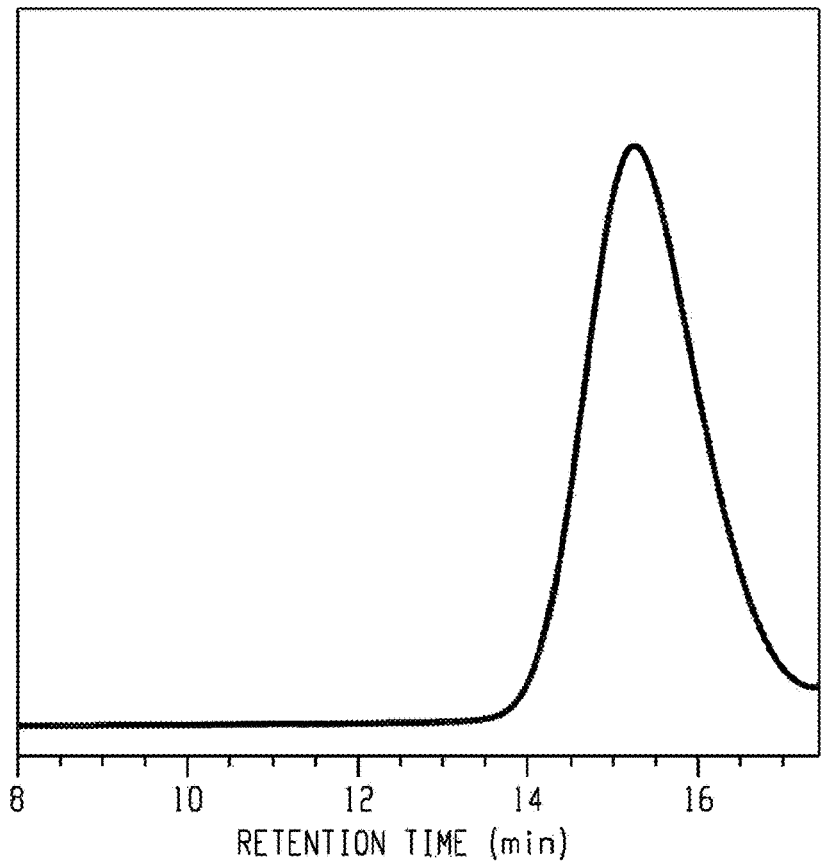
FIG. 2 depicts the chloroform ($CHCl_3$) size exclusion chromatography (SEC) trace of PAA of Ex. 12 after purification by dialysis and lyophilization, and methylation with $TMS\text{-}CHN_2$.

For Ex. 12 and 13, NaI (8.9 mg, 1 equiv), and either $K_2S_2O_8$ (12 mg, 0.75 equiv) or $H_2O_2$ (1.4 µL, 0.75 equiv) (approximately 5 µL of a 30% w/w solution in water) were added to a 1-dram vial, and dissolved in 0.4 mL of water. AA (0.3 mL, 75 equiv), passed through neutral alumina, and V70 (22 mg, 1.25 equiv) were added along with a magnetic stir bar. The rest of the procedure was the same as above. For Ex. 12, 95% AA conversion was observed, while no polymerization was observed for Ex. 13. The polymerization mixture of Ex. 12 was dialyzed against water for two days followed by lyophilization. The $M_n$ was 8200 g/mol and Đ was 1.32, measured by $CHCl_3$ SEC against PS standards after methylation with $TMS-CHN_2$. The SEC trace of purified and methylated PAA of Ex. 12 is reproduced in FIG. 2.

Ex. 14 was a replicate of Ex. 12, and showed that the high conversion of Ex. 12 was reproducible.

The procedure for Ex. 15 was the same as Ex. 13, except the oxidant was 0.2 equiv $H_2O_2$ (approximately 1 µL of a 30% w/w solution in water) instead of 0.75 equiv. The results are summarized in Table 4.

TABLE 4

Polymerization of AA Using NaI, V70, and (NH$_4$)$_2$S$_2$O$_8$ or H$_2$O$_2$

| Ex. | V70 (equiv) | K$_2$S$_2$O$_8$ (equiv) | H$_2$O$_2$ (equiv) | AA Conversion (%) |
|---|---|---|---|---|
| 10 | 0.25 | 3 | — | 0 |
| 11 | 0.25 | — | 3 | 0 |
| 12 | 1.25 | 0.75 | — | 95 |
| 13 | 1.25 | — | 0.75 | 0 |
| 14 | 1.25 | 0.75 | — | 95 |
| 15 | 1.25 | — | 0.2 | 95 |

Without being bound by theory, Ex. 12 and 14-15 may have given high conversion because the lower amount of oxidant (0.75 vs. 3 equiv K$_2$S$_2$O$_8$ and 0.2 vs. 3 equiv H$_2$O$_2$) may result in a lower concentration of iodine radical donors, such as I$_2$.$^-$ radical anion, which can serve as a deactivator by quenching propagating polymer radicals. Moreover, the higher amount of carbon-centered radical polymerization initiator (V70, 1.25 vs. 0.25 equiv) may initiate more propagating polymer radicals.

Examples 16-19. Polymerization of AA Using V70 and K$_2$S$_2$O$_8$ and Varying Amounts of NaI In Ex. 16-19, various amounts of NaI (18-88 mg, 1-5 equiv) were added to a 1-dram vial with a magnetic stir bar, and dissolved in 0.6 mL of water. V70 (45 mg, 1.25 equiv), AA (0.6 mL, 75 equiv), passed through neutral alumina, and K$_2$S$_2$O$_8$ (24 mg, 0.25 equiv) were added, forming a 50% v/v aq solution of AA. The vial was capped with a septum sealed cap and degassed by sparging with Ar for 5 min. The vial was placed in a heating block set at 45° C. The vial was stirred overnight. A small aliquot was taken and dissolved in D$_2$O for $^1$H NMR analysis. The PAA was purified and isolated by dialysis and lyophilization as described above, and was characterized by both aqueous and CHCl$_3$ SEC. Aqueous SEC was conducted against PAA standards. The PAA standards were prepared by deprotection of poly(t-butyl acrylate) made by atom transfer radical polymerization (ATRP). CHCl$_3$ SEC was conducted against PS standards on PMA formed by methylation of the isolated PAA with TMS-CHN$_2$ as described above. The results are summarized in Table 5 below.

TABLE 5

Polymerization of AA Using V70 and K$_2$S$_2$O$_8$ and Varying Amounts of NaI

| Ex. | NaI (equiv) | Time (h) | Conversion (%) | Isolated Yield (%) | M$_n$ (kg/mol) (Đ)$^a$ | M$_n$ (kg/mol) (Đ)$^b$ |
|---|---|---|---|---|---|---|
| 16 | 1 | 13 | 93 | 70 | 12.5 (2.58) | 17.9 (2.22) |
| 17 | 2 | 13 | 83 | 67 | 10.8 (2.17) | 14.1 (1.92) |
| 18 | 3 | 12 | 84 | 65 | 11.3 (2.28) | 15.6 (2.03) |
| 19 | 4 | 13 | 41 | — | — | — |

$^a$Aq SEC against PAA standards.
$^b$CHCl$_3$ SEC against PS standards after methylation.

These data show that 1 equiv of NaI (relative to 75 equiv of AA) is a sufficient amount to obtain high conversion and control over M$_n$ and Đ.

Examples 20-23. Polymerization of AA Using NaI, V70 and Varying Amounts of K$_2$S$_2$O$_8$ In Ex. 20-23, NaI (18 mg, 1 equiv) was added to a 1-dram vial with a magnetic stir bar, and dissolved in 0.6 mL of water. V70 (45 mg, 1.25 equiv), AA (0.6 mL, 75 equiv), passed through neutral alumina, and varying amounts of K$_2$S$_2$O$_8$ (0-63 mg, 0-2 equiv) were added, forming a 50% v/v aq solution of AA. The vial was capped with a septum sealed cap and degassed by sparging with Ar for 5 min. The vial was placed in a heating block set at 45° C. The vial was stirred overnight. A small aliquot was taken and dissolved in D$_2$O for $^1$H NMR analysis. The PAA was purified and isolated, and was characterized by both aqueous and CHCl$_3$ as described above. The results are summarized in Table 6 below.

TABLE 6

Polymerization of AA Using NaI, V70 and Varying Amounts of K$_2$S$_2$O$_8$

| Ex. | K$_2$S$_2$O$_8$ (equiv) | Time (h) | Conversion (%) | Isolated Yield (%) | M$_n$ (kg/mol) (Đ)$^a$ | M$_n$ (kg/mol) (Đ)$^b$ |
|---|---|---|---|---|---|---|
| 20 | 0 | <3 min | 92 | — | 20.2 (15.2) | 30.5 (6.18) |
| 21 | 0.75 | 13 | 93 | 70 | 12.5 (2.58) | 17.9 (2.22) |
| 22 | 1 | 12 | 94 | 61 | 19.2 (2.43) | 23.2 (2.22) |
| 23 | 2 | 24 | 0 | — | — | — |

$^a$Aq SEC against PAA standards.
$^b$CHCl$_3$ SEC against PS standards after methylation.

Figure 3:
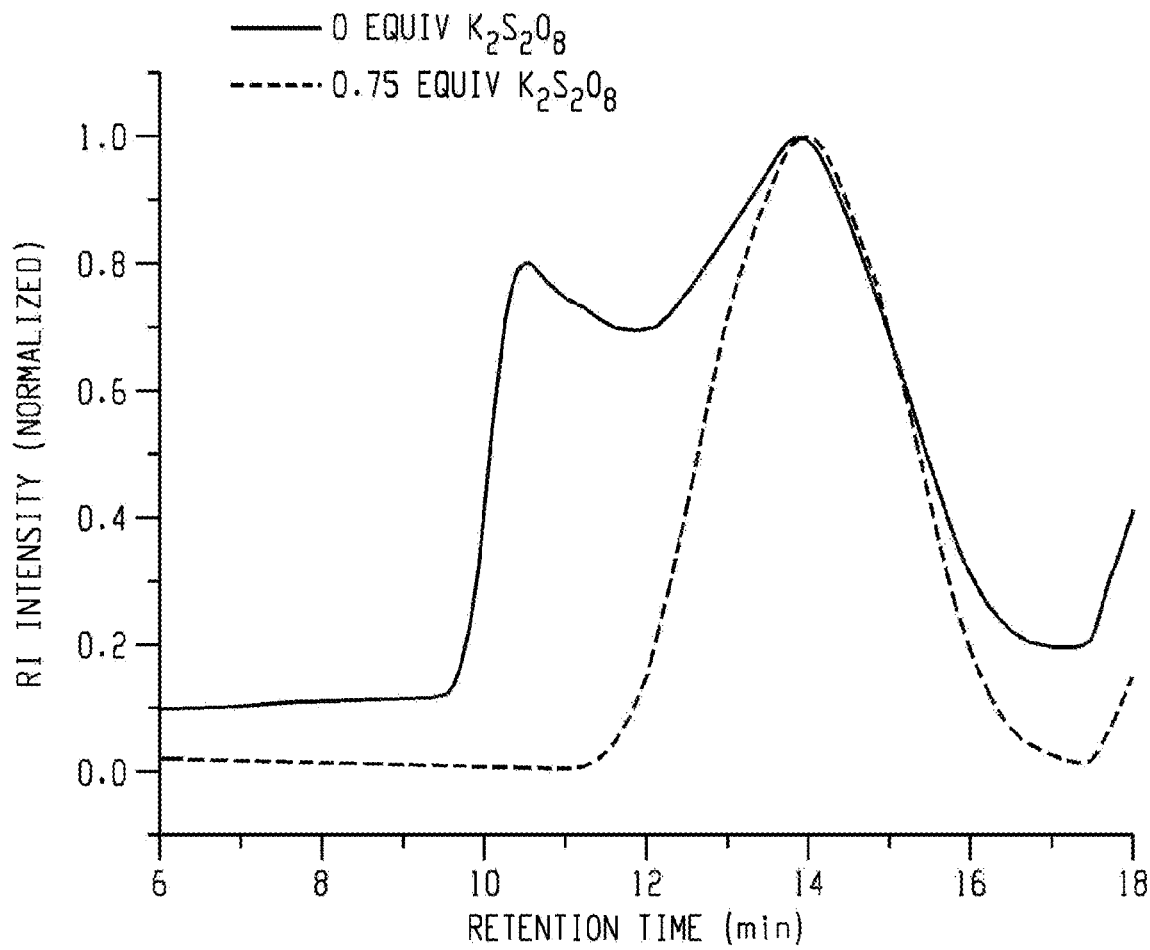
FIG. 3 depicts the $CHCl_3$ SEC traces of PAA of Ex. 20 (no $K_2S_2O_8$, dashed line) and 21 (0.75 equiv $K_2S_2O_8$, solid line) after purification by dialysis and lyophilization, and methylation with trimethylsilyl diazomethane ($TMS\text{-}CHN_2$).
Figure 4:
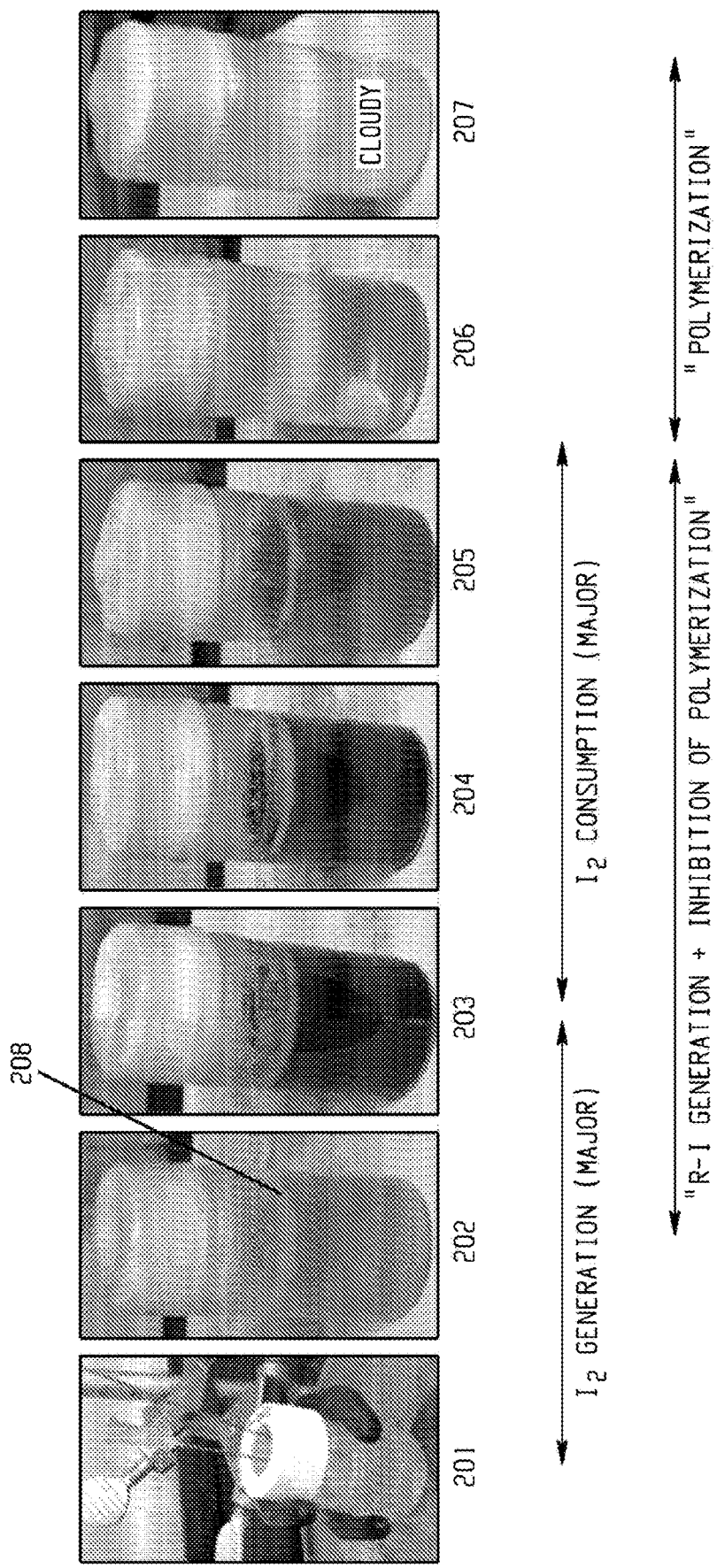
FIG. 4 depicts photos of the polymerization mixture of Ex. 44 taken during argon (Ar) degassing, and 0, 3, 5, 7, 16, and 24 hours (h) into the polymerization (201-207, respectively). The photos show darkening due to generation of $I_2$ (inhibition period, 202-203) and bleaching due to consumption of $I_2$ (inhibition period, 204-205). The color of the solution eventually becomes transparent due to the complete consumption of $I_2$ (at some time point between 205 and 206). Polymerization begins after complete consumption of $I_2$ (between 205 and 206) and continues to 207. 208 is undissolved 2,2'-azobis(4-methoxy-2,4-dimethylpentanenitrile (V70).

These data show that 0.75-1 equiv K$_2$S$_2$O$_8$ provides high conversion of AA (Ex. 21 and 22). Without K$_2$S$_2$O$_8$, the polymerization was uncontrolled, providing high M$_n$ and Đ, like that of free radical polymerization (Ex. 20). The SEC traces of Ex. 20 (no K$_2$S$_2$O$_8$,) and 21 (0.75 equiv K$_2$S$_2$O$_8$) are reproduced in FIGS. 3 and 4, respectively for comparison. As can see from FIG. 3, Ex. 21 (dashed line) had a narrow, unimodal number average molar mass distribution, while Ex. 20 (solid line) had a broad, bimodal number average molar mass distribution. Use of 2 equiv of K$_2$S$_2$O$_8$ inhibited polymerization, with no conversion of AA in Ex. 23.

Examples 25-26. Polymerization of AA Using NaI, V70 and Different Oxidants

The procedure of Ex. 21 was followed, except different oxidants were used —Na$_2$S$_2$O$_8$ (Ex. 25), and H$_2$O$_2$ (Ex. 26). In Ex. 26, 0.2 equiv of H$_2$O$_2$ and 1.1 equiv of V70 used, and the polymerization was conducted at 35° C. instead of 45° C. The results are summarized in Table 7 below.

TABLE 7

Polymerization of AA Using NaI, V70 and Different Oxidants

| Ex. | V501 | Time (h) | Conversion (%) | Isolated Yield (%) | M$_n$ (kg/mol) (Đ)$^a$ | M$_n$ (kg/mol) (Đ)$^b$ |
|---|---|---|---|---|---|---|
| 21 | K$_2$S$_2$O$_8$ | 13 | 93 | 70 | 12.5 (2.58) | 17.9 (2.22) |
| 25 | Na$_2$S$_2$O$_8$ | 20 | 97 | 60 | 17.1 (2.33) | 18.5 (2.16) |
| 26 | H$_2$O$_2$ | 4 | 89 | 72 | 18.2 (3.60) | 23.1 (2.93) |

$^a$Aq SEC against PAA standards.
$^b$CHCl$_3$ SEC against PS standards after methylation.

As can be seen from Table 7, both K$_2$S$_2$O$_8$ and Na$_2$S$_2$O$_8$ are effective oxidants for this polymerization. While good conversion (89%) was also obtained with H$_2$O$_2$, Đ was higher.

Examples 27-28. Polymerization of AA Using NaI, V70 and K$_2$S$_2$O$_8$ at Different Temperatures The procedure of Ex. 21 was followed, except the polymerization was conducted at different temperatures. The results are summarized in Table 8 below.

TABLE 8

Polymerization of AA Using NaI, V70, and $K_2S_2O_8$ at Different Temperatures

| Ex. | Temperature (° C.) | Time (h) | Conversion (%) | Isolated Yield (%) | $M_n$ (kg/mol) (Đ)[a] | $M_n$ (kg/mol) (Đ)[b] |
|---|---|---|---|---|---|---|
| 27 | 35 | 18 | 96 | — | 15.5 (2.35) | — |
| 21 | 45 | 13 | 93 | 70 | 12.5 (2.58) | 17.9 (2.22) |
| 28 | 70 | 24 | 59 | — | 11.1 (2.83) | — |

[a]Aq SEC against PAA standards.
[b]$CHCl_3$ SEC against PS standards after methylation.

Polymerization at 35 and 45° C. provided excellent conversion. While polymerization at 70° C. provided faster decolorization (consumption of $I_2$ by alkyl radicals) and increased viscosity, only moderate conversion was obtained (59%), even after 24 h.

Examples 29-30. Polymerization of AA Using NaI, V501 and $K_2S_2O_8$

The procedure of Ex. 21 was followed, except 0.75 equiv (25 mg, Ex. 29) or 1.25 equiv (41 mg, Ex. 30) of V501, a water-soluble radical polymerization initiator, and a polymerization temperature of 70° C., were used. The results are summarized in Table 9.

TABLE 9

Polymerization of AA Using NaI, V501, and $K_2S_2O_8$

| Ex. | V501 (equiv) | Time (h) | Conversion (%) | Isolated Yield (%) | $M_n$ (kg/mol) (Đ)[a] | $M_n$ (kg/mol) (Đ)[b] |
|---|---|---|---|---|---|---|
| 29 | 0.75 | 24 | 97 | 74 | 17.0 (4.78) | — |
| 30 | 1.25 | 24 | 99 | 52 | 16.7 (4.15) | — |
| 28 | 1.25[c] | 24 | 59 | — | 11.1 (2.83) | — |

[a]Aq SEC against PAA standards.
[b]$CHCl_3$ SEC against PS standards after methylation.
[c]V70 instead of V501 for comparison.

As can be seen from Table 9, polymerization with V501 at 70° C. provided excellent conversion, but high Đ (Ex. 29-30), while polymerization with V70 at 70° C. provided moderate conversion, but moderate Đ (Ex. 28).

Examples 31-34. Polymerization of AA Using NaI, V501, and $K_2S_2O_8$ at Different AA Concentrations in Water The procedure of Ex. 21 was followed, except the amount of water was varied from 1/2 to 4/1 AA/$H_2O$ (v/v). The results are summarized in Table 10 below.

TABLE 10

Polymerization of AA Using NaI, V501, and $K_2S_2O_8$ at Different AA Concentrations in Water

| Ex. | AA/$H_2O$ (v/v) | Time (h) | Conversion (%) | Isolated Yield (%) | $M_n$ (kg/mol) (Đ)a | $M_n$ (kg/mol) (Đ)[b] |
|---|---|---|---|---|---|---|
| 31 | 1/2 | 21 | 99 | 69 | 13.7 (2.34) | 18.9 (2.12) |
| 21 | 1/1 | 13 | 93 | 70 | 12.5 (2.58) | 17.9 (2.22) |
| 32 | 2/1 | 6 | 78 | 55 | 14.0 (2.59) | 16.9 (2.20) |
| 33 | 4/1 | 6 | 62 | 50 | 13.2 (2.83) | 17.8 (2.43) |
| 34 | Bulk[c] | 5 | 43 | — | — | — |

[a]Aq SEC against PAA standards.
[b]$CHCl_3$ SEC against PS standards after methylation.
[c]Neat (no water).

As can be seen from Table 10, AA/$H_2O$ ratios of both 1/2 and 1/1 (v/v) provided excellent conversion (Ex. 31 and 21, respectively). However, the ratio of 1/2 is recommended because the polymerization is highly exothermic at the initial stage after decolorization (complete consumption of $I_2$ by alkyl radical).

Examples 35-38. Copolymerization of NaA and AA at Different NaA/AA Ratios

The procedure of Ex. 21 was followed, except different AA/NaA ratios (75 equiv total NaA and AA) and different concentrations in water were used, as indicated in Table 11 below.

TABLE 11

Copolymerization of AA and NaA at Different AA/NaA Ratios

| Ex. | NaA/AA (mol ratio) | Time (h) | Conversion (%) | Isolated Yield (%) | $M_n$ (kg/mol) (Đ)[a] | $M_n$ (kg/mol) (Đ)[b] |
|---|---|---|---|---|---|---|
| 35 | 0/50[c] | 20 | 97 | — | 11.4 (2.11) | 16.0 (1.95) |
| 36 | 25/25[c] | 2.5 | 89 | — | 31.0 (5.74) | — |
| 37 | 40/10[d] | 24 | 87 | 70 | 33.5 (8.68) | — |
| 38 | 50/0[d] | 24 | 69 | — | 32.1 (16.27) | — |

[a]Aq SEC against PAA standards.
[b]$CHCl_3$ SEC against PS standards after methylation.
[c]Total 14.6M (NaA + AA)/$H_2O$.
[d]Total 5.9M (NaA + AA)/$H_2O$.

As can be seen from Table 11, a NaA/AA mol ratio of 1/1 accelerated the polymerization, resulting in 89% conversion in only 2.5 h (Ex. 36). However use of mixtures of NaA and AA also resulted in less control over $M_n$ and Đ.

Examples 39-43. Polymerization of AA at Different AA/NaI Ratios

The procedure of Ex. 21 was followed, except the amount of AA was varied from 25 to 150 equiv, relative to 1 equiv of NaI. The results are summarized in Table 12 below. Except for Ex. 43 (150/1 AA/NaI mol ratio), excellent conversion was obtained. $M_n$ was proportional to AA/NaI mol ratio. However, the experimentally determined $M_n$ values did not match the theoretical $M_n$ values calculated from the AA/NaI mol ratio, indicating that the polymerization was not 100% controlled.

TABLE 12

Polymerization of AA at Different AA/NaI Ratios

| Ex. | AA (equiv) | Time (h) | Conversion (%) | $M_n$ (kg/mol) (Đ)$^a$ | Mn (kg/mol) (Đ) $^b$ |
|---|---|---|---|---|---|
| 39 | 25  | 18 | 91 | 0.8 (2.76) | 8.5 (1.84) |
| 40 | 50  | 20 | 97 | 4.0 (2.88) | 11.4 (2.11) |
| 41 | 75  | 13 | 93 | 4.3 (2.77) | 12.5 (2.58) |
| 42 | 100 | 20 | 95 | 1.3 (8.89) | 15.0 (2.77) |
| 43 | 150 | 18 | 78 | 23.2 (2.60) | 16.5 (2.79) |

$^a$Crude PAA, aq SEC against PAA standards.
$^b$Purified PAA, aq SEC against PAA Example 44. Scale-Up Polymerization of AA In a 1-dram vial with a magnetic stir bar, NaI (234 mg, 1 equiv) was added and dissolved in 8.32 mL of water. V70 (585 mg, 1.25 equiv), AA (4.16 mL, 40 equiv, 67 vol % in the water), passed through neutral alumina, and $K_2S_2O_8$ (312 mg, 0.75 equiv) were added sequentially to the vial. The vial was capped with a septum sealed cap and degassed by sparging with Ar for 10 min. The vial was placed in a heating block set at 45° C. for 24 h.

Photos of the polymerization mixture were taken during Ar degassing (201), and 0, 3, 5, 7, 16, and 24 h into the polymerization (202-207, respectively), and are reproduced in FIG. 5. 208 indicates undissolved V70 residue at the water-Ar interface in 202. $I_2$ generation peaks at about 3 h, as evidenced by the dark color in 203. 204 and 205 show bleaching, indicating consumption of $I_2$ by reaction with alkyl radicals. Most of the polymerization is believed to occur after 7 h (205), when $I_2$ content is minimized. At 16 h (206), the color is gone, and the mixture is transparent and viscous. At 24 h (207), the mixture is colorless, translucent, and viscous.

A small aliquot was taken and dissolved in $D_2O$ for $^1H$ NMR analysis, which indicated >98% conversion. $CHCl_3$ SEC analysis against PMMA standards of the crude PAA after methylation with $TMS-CHN_2$ indicated a $M_n$ of 10.7 kg/mol and a Đ of 1.89.

Chemistry abbreviations used herein, but not otherwise identified, are those specified by the *Journal of Organic Chemistry Guideline for Authors*, updated April 2018. Other abbreviations used herein are identified in Table 1 (Materials) and Table 2 (Abbreviations).

As used herein, "polymer" can be a homopolymer or a copolymer, and "copolymer" is defined as a polymer composed of at least two different polymerized comonomers.

As used herein, the term "(meth)acrylic acid" denotes acrylic acid, methacrylic acid, or a combination of acrylic acid and methacrylic acid; and the term "(meth)acrylate" denotes acrylate, methacrylate, or a combination of acrylate and methacrylate.

The term "(meth)acrylic acid polymer" refers to poly (acrylic acid) and salts thereof and/or poly(methacrylic acid) and salts thereof. The term "(meth)acrylic acid polymer" also includes copolymers of acrylic acid and salts thereof, and/or methacrylic acid and salts thereof, with other (meth) acrylate monomers and/or vinyl monomers. The shorthand "PAA" refers to poly(acrylic acid), "PMAA" refers to poly (methacrylic acid), and "P(AA-co-NaA)" refers to a copolymer of acrylic acid and sodium acrylate.

As used herein, the term "nonionic monomer" refers to ethylenically unsaturated monomers that are not ionized, i.e. they do not bear a charge, at pH 1 to 14.

A used herein a "salt" can be an alkali metal salt, an alkaline earth metal salt, an ammonium salt, or a quaternary ammonium salt. The salt can be, for example, a lithium salt, a sodium salt, a potassium salt, a calcium salt, or an ammonium salt. In some embodiments, the salt is a sodium salt.

As used herein, "combination thereof" and "combination comprising at least one of the foregoing" are inclusive of one or more of the recited elements, optionally together with a like element not recited.

The compositions, methods, and articles can alternatively comprise, consist of, or consist essentially of, any appropriate materials, steps, or components herein disclosed. The compositions and methods can additionally, or alternatively, be formulated so as to be devoid, or substantially free, of any materials (or species), steps, or components, that are otherwise not necessary to the achievement of the function or objective of the compositions and methods.

All ranges disclosed herein are inclusive of the endpoints, and the endpoints are independently combinable with each other (For example, "10, 25, or 50 equivalents and less than or equal to 75, 100, 150, or 300 equivalents" is inclusive of the endpoints and all intermediate values of the ranges, including for example, "25 to 150 equivalents, 25 to 75 equivalents, and 50 to 100 equivalents".)

"Combinations" includes blends, mixtures, reaction products, and the like, of the recited materials. The terms "a" and "an" and "the" do not denote a limitation of quantity, and are to be construed to cover both the singular and the plural, unless otherwise indicated herein or clearly contradicted by context. "Or" means "and/or" unless clearly stated otherwise.

Reference throughout the specification to "some embodiments", "an embodiment", and so forth, means that a particular element described in connection with the embodiment is included in at least one embodiment described herein, and may or may not be present in other embodiments. In addition, it is to be understood that the described elements can be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed, and as they can be amended, are intended to embrace all such alternatives, modifications variations, improvements, and substantial equivalents.

The invention claimed is:

1. A method of making a (meth)acrylic acid polymer, comprising reverse iodine transfer polymerization of an ethylenically unsaturated monomer comprising (meth) acrylic acid, salt thereof, or combination thereof, in the presence of:

a radical polymerization initiator that generates carbon-centered radicals;
an oxidant;
an iodide salt; and
a solvent.

2. The method of claim 1, wherein the ethylenically unsaturated monomer comprises a combination of (meth)acrylic acid and salt thereof.

3. The method of claim 1, wherein the (meth)acrylic salt and the iodide salt are each, independently, an alkali metal salt, an alkaline earth metal salt, an ammonium salt, a quaternary ammonium salt, or a combination comprising at least one of the foregoing salts.

4. The method of claim 1, wherein the ethylenically unsaturated monomer further comprises one or more other (meth)acrylic or vinyl monomers.

5. The method of claim 1, wherein the solvent is an aqueous solvent comprising 50 to 100 volume percent water, based on the total volume of the solvent.

6. The method of claim 1, wherein the radical polymerization initiator is an azo polymerization initiator.

7. The method of claim 1, wherein the oxidant is a peroxide.

8. The method of claim 1, wherein the polymerization is conducted at 0 to 140° C. for 1 minute to 48 hours.

9. The method of claim 1, wherein the solvent comprises water, and the ethylenically unsaturated monomer is present as a 10 to 90 volume percent solution in the solvent, based on the total volume of the ethylenically unsaturated monomer and solvent.

10. The method of claim 1, comprising reverse iodine transfer polymerization of 5 to 500 equivalents of the ethylenically unsaturated monomer comprising (meth)acrylic acid, salt thereof, or combination thereof, in the presence of 1 to 3 equivalents of the radical polymerization initiator, 0.2 to 1 equivalent of the oxidant, and 1 equivalent of the iodide salt.

11. The method of claim 1, comprising reverse iodine transfer polymerization of 2.5 to 250 equivalents of (meth)acrylic acid and 2.5 to 250 equivalents of a salt of (meth)acrylic acid, in the presence of 1 to 3 equivalents of the radical polymerization initiator, 0.2 to 1 equivalent of the oxidant, and 1 equivalent of the iodide salt.

12. The method of claim 1, wherein the (meth)acrylic polymer or copolymer has less than or equal to 5% branching, as calculated from $^{13}$C NMR data, and has a molar mass ($M_n$) of 1 to 100 kg/mol and a dispersity of 1 to 5, as measured by chloroform size exclusion chromatography against polystyrene standards after methylation with trimethylsilyl diazomethane.

13. A method of making a (meth)acrylic polymer or copolymer, comprising reverse iodine transfer polymerization of 2.5 to 250 equivalents of acrylic acid and 2.5 to 250 equivalents of sodium acrylate, both dissolved in water to form a 40 to 60 volume percent solution, based on the total volume of the acrylic acid, sodium acrylate, and water, in the presence of:
1 to 2 equivalents of an azo polymerization initiator;
0.4 to 1 equivalent of a persulfate; and
1 equivalent of an alkali metal iodide.

14. A (meth)acrylic polymer or copolymer solution made by the method of claim 1, wherein the (meth)acrylic polymer or copolymer has less than or equal to 5% branching, as calculated from $^{13}$C NMR data, and has a molar mass ($M_n$) of 1 to 100 kg/mol and a dispersity (Đ) of 1 to 5, as measured by chloroform size exclusion chromatography against polystyrene standards after methylation with trimethylsilyl diazomethane.

15. The (meth)acrylic polymer or copolymer solution of claim 14, comprising a 10 to 90 volume percent aqueous solution of the (meth)acrylic polymer of copolymer, based on the total volume of the (meth)acrylic polymer or copolymer and water.

16. The (meth)acrylic polymer or copolymer solution of claim 14, made by reverse iodine transfer polymerization of 5 to 500 equivalents of the ethylenically unsaturated monomer comprising (meth)acrylic acid, salt thereof, or combination thereof, in the presence of 1 to 3 equivalents of the azo polymerization initiator, 0.2 to 1 equivalent of the oxidant, and 1 equivalent of the iodide salt.

17. The (meth)acrylic polymer or copolymer solution of claim 14, wherein the (meth)acrylic polymer or copolymer solution is made by copolymerization of 2.5 to 250 equivalents of acrylic acid and 2.5 to 250 equivalents of sodium acrylate.

* * * * *